United States Patent [19]
Venturini

[11] Patent Number: 4,468,725
[45] Date of Patent: Aug. 28, 1984

[54] DIRECT AC CONVERTER FOR CONVERTING A BALANCED AC POLYPHASE INPUT TO AN OUTPUT VOLTAGE

[75] Inventor: Marco Venturini, Milan, Italy

[73] Assignee: Texas Instruments Incorporated, Dallas, Tex.

[21] Appl. No.: 390,000

[22] Filed: Jun. 18, 1982

[51] Int. Cl.$^3$ .................. H02P 5/34; H02M 5/27
[52] U.S. Cl. .................................... 363/160; 318/807
[58] Field of Search ............... 318/807, 811; 363/3, 363/8, 9, 148, 149, 159–164

[56] References Cited

U.S. PATENT DOCUMENTS

| | | | |
|---|---|---|---|
| 3,493,838 | 2/1970 | Gyugyi et al. | 363/163 X |
| 3,585,486 | 6/1971 | Gyugyi | 363/164 X |
| 3,754,180 | 8/1973 | Rauschenbach et al. | 363/157 |
| 3,816,808 | 6/1974 | Enslin et al. | 363/162 X |
| 3,971,972 | 7/1976 | Stich | 363/149 X |
| 4,008,428 | 2/1977 | Waldmann et al. | 363/160 |
| 4,041,368 | 8/1977 | Gritter | 363/157 X |

OTHER PUBLICATIONS

New Power Converter Technique Employing Power Transistors—A. Daniels, D. Slattery, "Proc. IEE" vol. 125, No. 2, Feb. 1978, pp. 146–150.
An Adjustable—Speed Induction Motor Drive with a Cycloconverter—Type Thyristor—Commutator in the Rotor—A. Chattopadhyay, IEEE Transactions on Industry Pub. vol. 1A-14, No. 2, Mar./Apr. 1978.

*Primary Examiner*—A. D. Pellinen
*Attorney, Agent, or Firm*—N. Rhys Merrett; Mel Sharp

[57] ABSTRACT

A direct AC converter for converting a polyphase AC input supply into an output DC or single or polyphase AC supply of amplitude, phase, frequency or power factor which is different from the input supply using a matrix of bidirectional switches having contiguous width modulated conduction periods in cycles which synthesize the output supply voltage or voltages from samples of the input supply voltages taken cyclically at a much higher frequency than the supply frequency or frequencies. The switches are operated so that the or each output supply conductor is connected to only one of the input supply conductors at a time. The width modulation may be effected in response to phases of a sinusoidal oscillation to produce a frequency change. The output may have a "negative" frequency so that a phase displacement between current and voltage due to a reactive load appears in the opposite sense in the input supply. Width modulation may alternatively be effected by a combination of two sinusoidal oscillations so that the output frequency has equal positive and negative values to eliminate phase displacements in the input supply due to a reactive load. Motor speed control and generator output frequency control applications are described.

32 Claims, 23 Drawing Figures

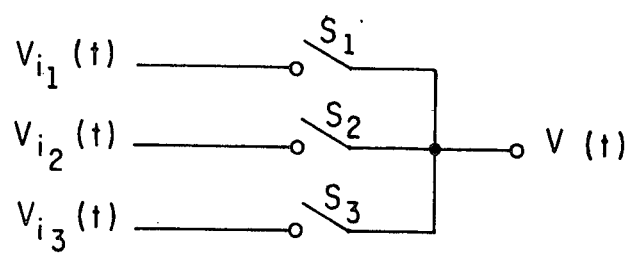
Fig. I(a)
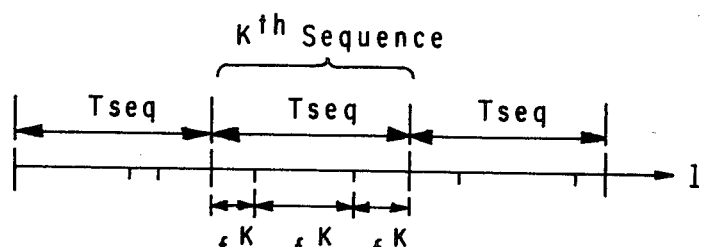
Fig. I(b)
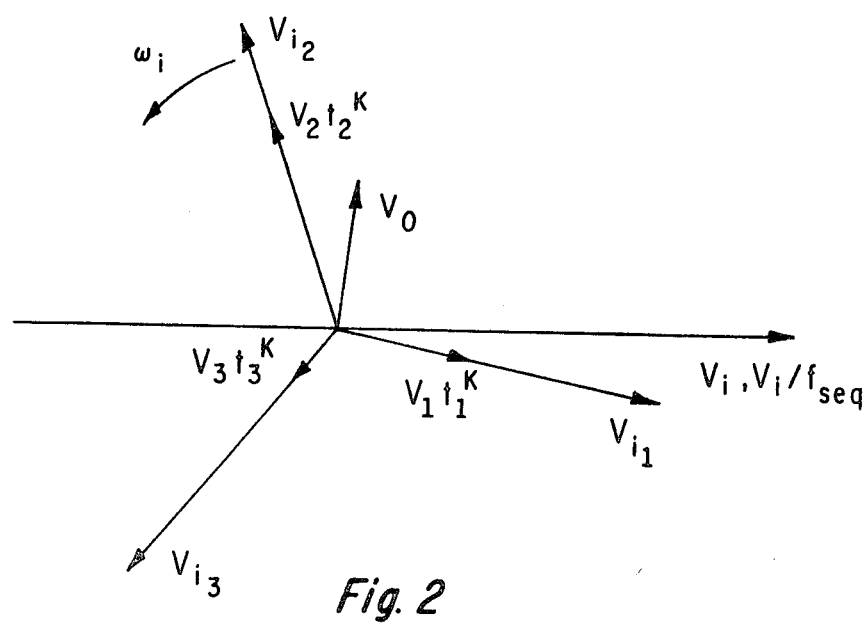
Fig. 2

DIRECT AC CONVERTER FOR CONVERTING A BALANCED AC POLYPHASE INPUT TO AN OUTPUT VOLTAGE

This is continuation of application Ser. No. 126,140 filed Feb. 29, 1980, abandoned.

The present invention relates to a direct AC/AC converter, that is, a converter in which an alternating current output is obtained directly from an alternating current input without passing through any intermediate direct current stage, which is able to produce modified characteristics such as the frequency, amplitude, or power factor, at the output relative to the corresponding characteristics of a polyphase AC system at the input.

In many applications an electrical power supply is needed having characteristics different from those of an available supply. For example, for using an induction motor at a speed variable by controlling the supply frequency and voltage thereof, or for reducing and stabilizing the frequency of the voltage generated by the main alternator coupled to a turbine in jet aircraft. In particular, frequency conversion is especially useful for all those electrical machines, such as motors and transformers, in which a higher frequency of the supply voltage than one which is suitable for supply transmission would permit a compact and inexpensive construction.

In addition to modification of the voltage and frequency it is also desirable to be able to modify the phase angle of the energy which passes through the converter, and to do this without using reactive elements.

The desirable properties of an AC converter may be summarised as:
1. The possibility of controlling output amplitude and frequency;
2. The input and output wave forms to be substantially sinusoidal or at least to be wave forms whose undesired harmonics are well separated from the fundamental and having a definitely higher frequency, with a total absence of sub-harmonics;
3. The possibility of allowing a bidirectional energy flow (e.g. for regenerative braking of motors);
4. An absence of reactive elements; it is, in fact, foreseeable that the continual improvement of semiconductor technology will lead to notable improvements in the performance of solid state switches with reduction of cost and size, but a similar improvement is unlikely for reactive elements, which therefore would always constitute the element that most obstructs and holds back technological development in a converter;
5. The possibility of controlling the phase angle of the energy absorbed by the load through the converter group.

Various types of AC converters have been proposed which, for one reason or another, do not allow all five of the properties listed above to be obtained. The converters existing today can be divided into two principal categories—the AC/DC/AC converters and the direct converters.

The AC/DC/AC converters consist of two separate stages: In the first stage the input is converted into a direct current or voltage and this current or voltage is then supplied to the second stage, which inverts it creating an output of alternating current at the desired frequency. Without going into a detailed analysis of the various types of AC/DC/AC converters, it is noted that they generally present various disadvantages such as a bad output wave form, the presence of filters, unidirectionality, the large number of semiconductors needed, or limitations relating to the wave form at the input or to the output impedance, which limit their preformance and possibilities of use.

Direct converters, instead, directly synthesize the AC output from the AC input without any intermediate DC stage. Among the best known converters of this type are: the cycloconverter, in which each output consists essentially of an AC/DC converter, and the converters recently proposed by Westinghouse and defined by the symbols UFC (Unrestricted Frequency Changer) and SSFC (Slow Switched Frequency Changer).

In particular these last two converters provide for the "construction" of the output frequency by matrices of switches which are closed according to pre-established programs and functions. These converters are advantageous also with regard to the harmonics at the input as well as at the output, but they do not permit a control of the phase displacement of the load or of the output voltage and require a large number of input phases to be able to reduce the harmonics content at the output.

It is therefore an object of the present invention to provide an improved direct AC converter in which undesired harmonics content of its wave forms, both of the input current and of the output voltage, can easily be shifted toward high frequencies, which enables bidirectional operation, and permits controlling the frequency, amplitude, phase angle at the output and the input power factor.

According to the present invention there is provided a direct AC converter including input conductors for a balanced polyphase AC input voltage system, output conductors for an AC output voltage system having at least one characteristic such as frequency, amplitude, phase angle or phase displacement which is different from that of the input voltage system, and a plurality of bidirectional switches which individually connect each input conductor to each output conductor, characterised by a control system including timing means which produces a repeating sequence of mutually abutting width modulated pulses, there being the same number of pulses in the sequence as there are phases in the input voltage system, the control means being connected to the switches so that the pulses cause the switches to be closed in such a way that each phase of the input voltage system is connected in turn to each phase of the output voltage system, that at any given instant only one of the switches connected to any one of the output conductors is closed, and that each input conductor is always connected to at least one output conductor.

The output voltage system may be a single phase or poly-phase system. The sequence of width modulated pulses, when modulated by equispaced phases of a sinusoidal wave of a modulating frequency, will cause the frequency of the output voltage system to differ from that of the input voltage system by the modulating frequency. Preferably the sequence of width modulated pulses is repeated between 1,000 and 100,000 times per second and filters may be provided in the output conductors to absorb high frequency components due to the operation of the switches by the sequence of pulses.

The sequence of pulses may be produced by analogue or digital means, and one example of a suitable analogue means is a ring of controllable monostable multivibrators connected so that the resetting of one multivibrator triggers the next in the ring, and equally spaced phases of a modulating oscillation may be applied to control the set times of respective multivibrators. Digital means operating on the same principle could be used as an alternative employing digital differential analyser techniques or as an alternative a suitably programmed microprocessor could be employed.

A converter embodying to the invention may be arranged to produce an output voltage of negative frequency so that it produces in the input conductors the opposite phase displacement between current and voltage from that in the output conductors when the output voltage is applied to a reactive load. A converter could also be used to provide power factor control of the input supply if the pulses of the sequence were modulated in width by a combination of different phases of two sinusoidal oscillations of different frequencies which if used independently would produce output voltages of equal, but positive and negative, frequencies. If in such a converter the output frequency is equal in magnitude to the input frequency and both input and output have the same number of phases, the input conductors could be connected to the output conductors via a transformer to form a reactive power generator. Furthermore a reactive load fed by the output supply could be made to appear to the input supply as a purely resistive load. Where such an arrangement would result in a short-circuiting of a supply by the switches at certain times it is desirable that suitable inductances be connected in the supply conductors to reduce high currents which would otherwise flow through the switches.

Amongst the applications for a converter embodying the invention is the speed control of an induction motor achieved by varying the frequency of the supply applied to the motor. If desired, a feedback of signals representative of the motor's shaft speed can be applied to the converter to provide either constant speed operation of the motor or constant torque operation by measuring the slip between the drive frequency and the motor speed.

In order that the invention may be fully understood and readily carried into effect it will now be described with reference to the accompanying drawings, of which:

FIG. 1a is a diagram to be used in explaining the operation of a three-phase input single-phase output converter;

FIG. 1b illustrates the switching times for the converter of FIG. 1a;

FIG. 2 is a vector diagram showing the synthesis of the output voltage of the converter of FIG. 1a;

Figure 6:
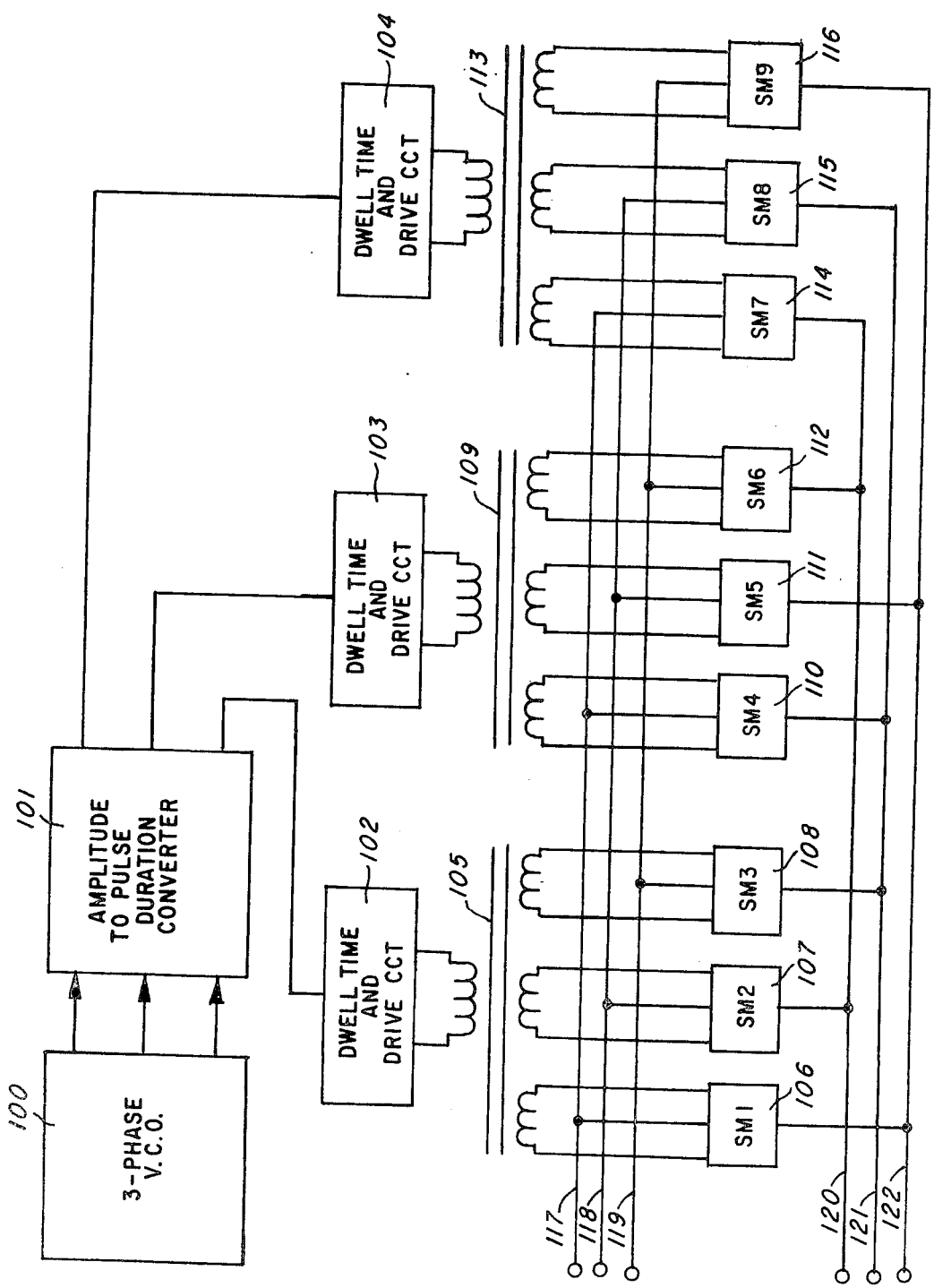
FIG. 6 is a block diagram of a practical realisation of a three-phase input three-phase output converter.
Figure 10:
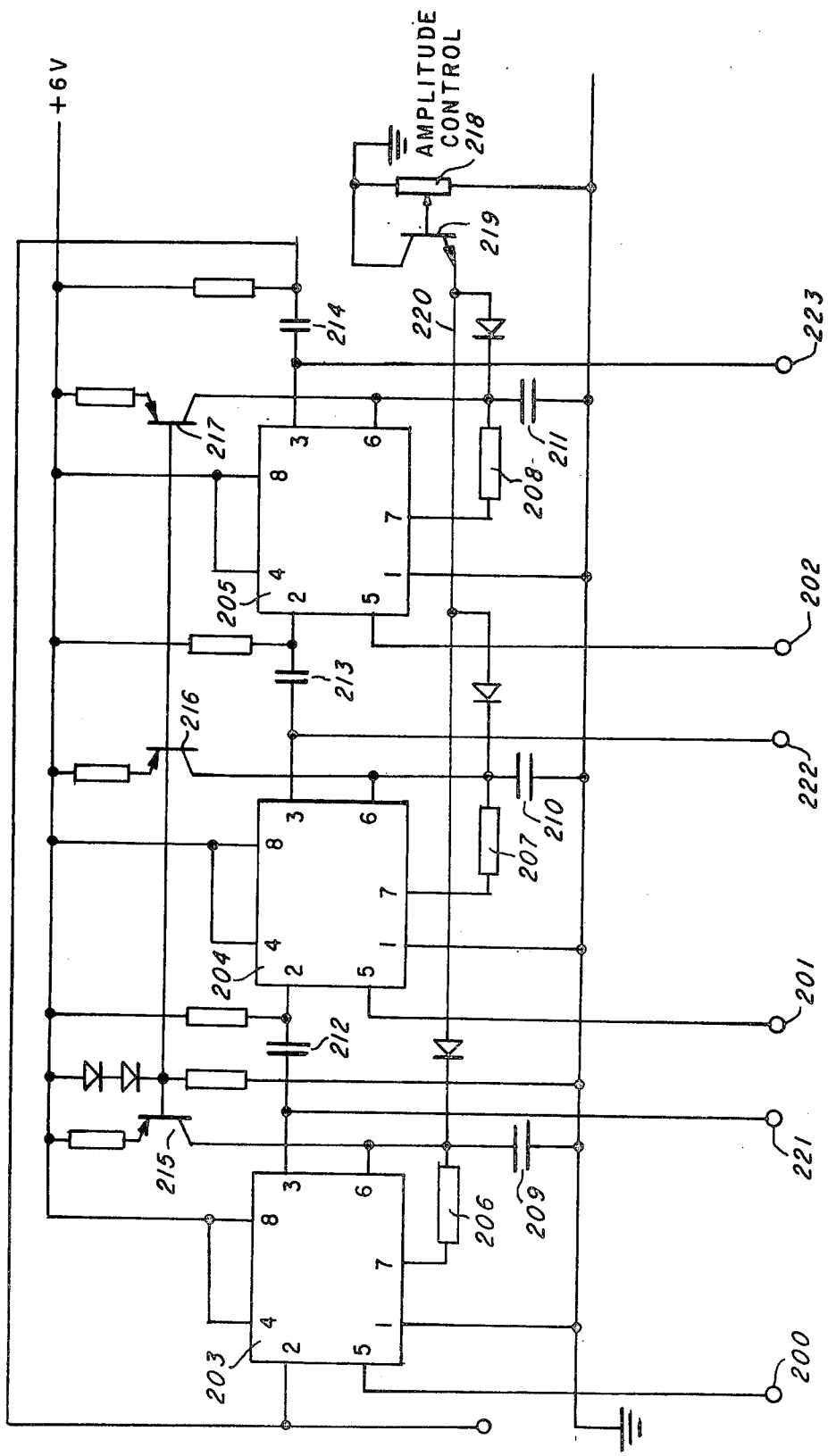
Figure 11:
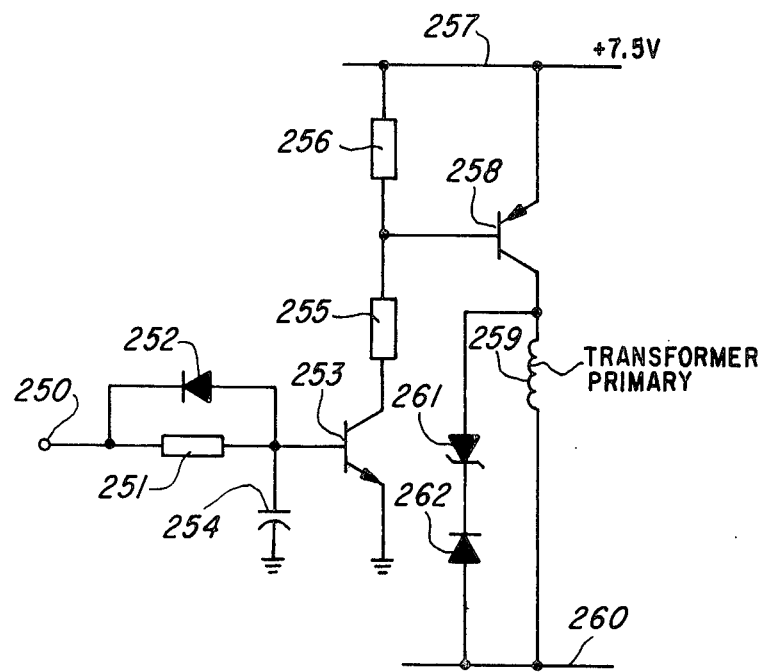
Figure 12:
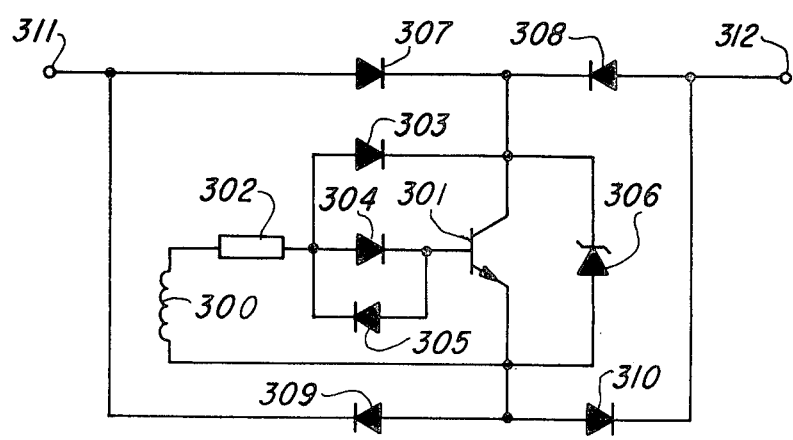
Figure 13A:
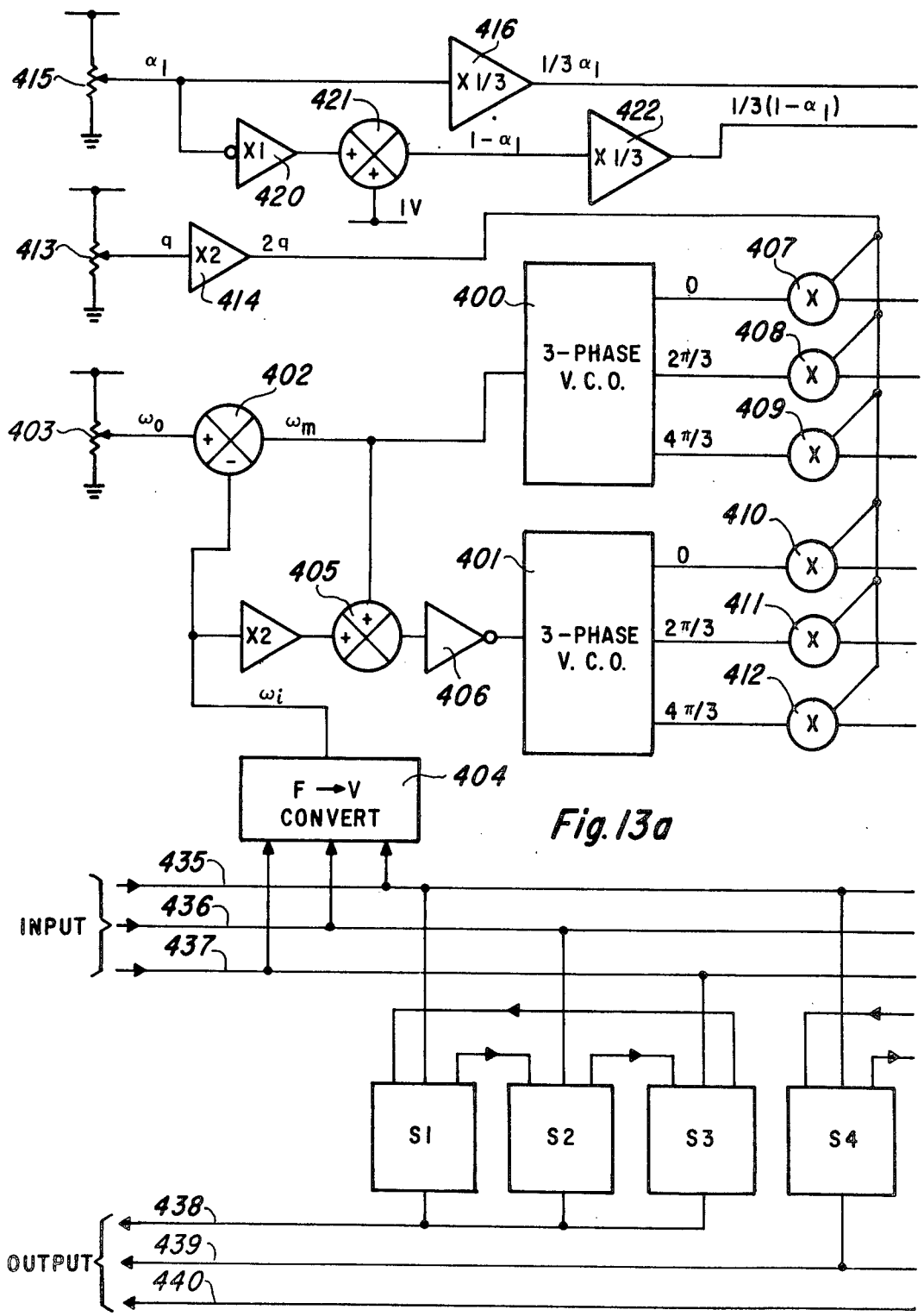
Figure 13B:
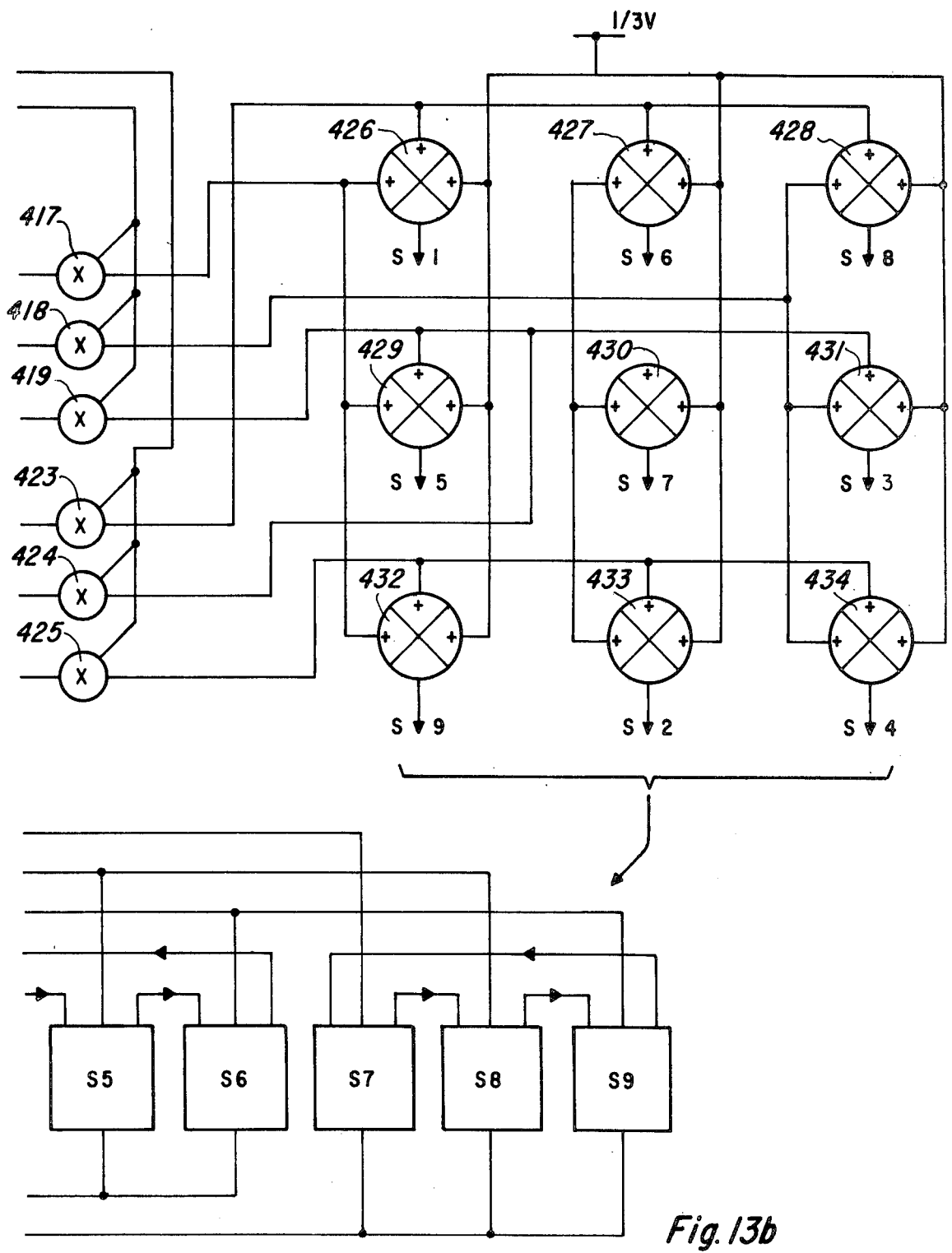
Figure 14:
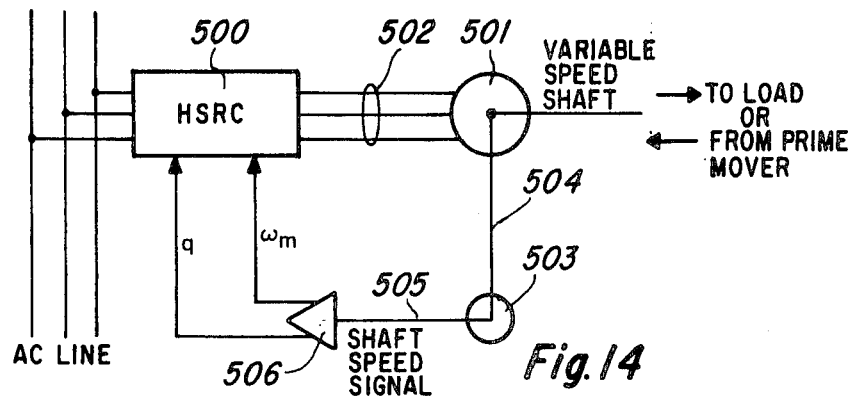
Figure 15:
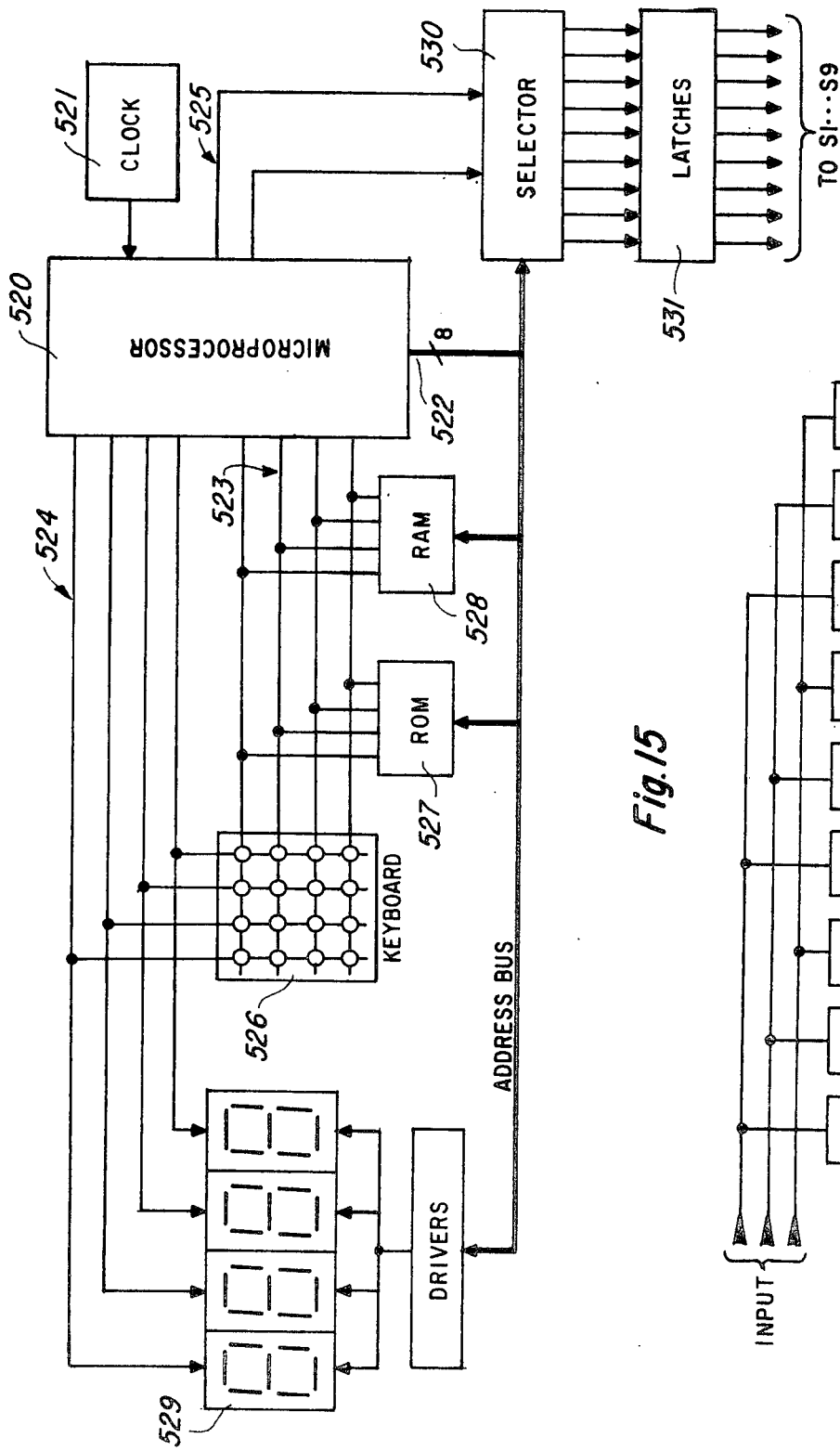

FIGS. 7, 8a, 8b and 9 together constitute a detailed diagram of a three-phase voltage controlled oscillator suitable for converter of FIG. 6;

FIG. 10 is a diagram of an amplitude to pulse duration converter suitable for use in the converter of FIG. 6;

FIG. 11 is a dwell time and drive circuit suitable for use in a converter of FIG. 6;

FIG. 12 is one example of a switch module suitable for use in FIG. 6;

FIG. 13a and 13b show a converter capable of providing phase displacement control;

FIG. 14 shows a motor speed control circuit using a converter embodying the invention;

FIG. 15 shows an embodiment of the invention employing a microprocessor to provide the control of switching times; and FIGS. 16, 17, 18, 19 and 20 show alternative forms of switch which can be employed in a converter embodying the invention.

The theoretical basis of a converter according to the invention will not be described with reference to FIGS. 1 to 5.

Figure 3:
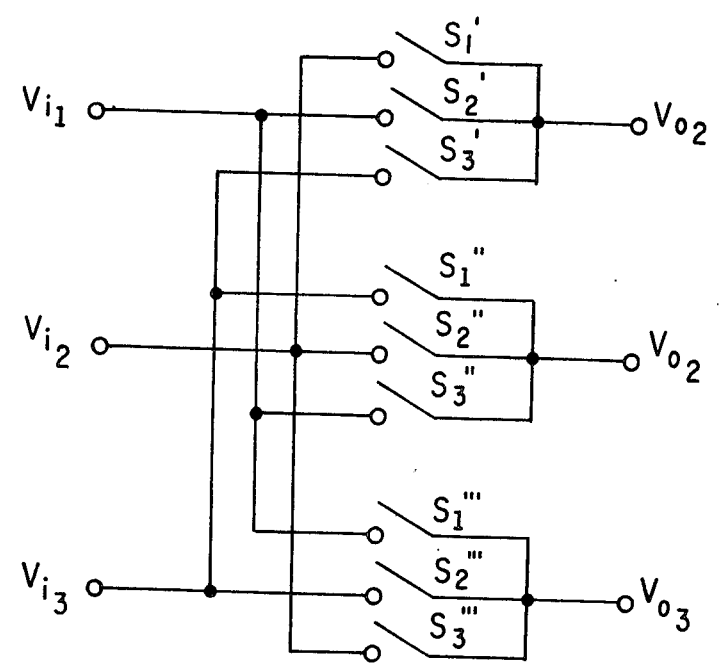
FIG. 3 shows the principle of a three-phase input three-phase output converter.

A three phase to three phase A.C. converter consists of nine switches, for connecting each input line with each output line (FIG. 3). The design problem in the converter can be stated as follows: Given a set of input sinusoidal voltages at input frequency $2\pi\omega_i$ $$Vi_1 = Vi \cos \omega_i t$$
$$Vi_2 = Vi \cos (\omega_i t + \tfrac{2}{3}\pi) \quad (1)$$
$$Vi_3 = Vi \cos (\omega_i t + [4/3]\pi),$$

and a set of output sinusoidal currents at output frequency $2\pi\omega_o$ $$Io_1 = I_o \cos (\omega_o t + \phi)$$
$$Io_2 = I_o \cos (\omega_o t + \tfrac{2}{3}\pi + \phi) \quad (2)$$
$$Io_3 = I_o \cos (\omega_o t + [4/3]\pi + \phi),$$

the problem is to determine $S_{11}, S_{12} \ldots S_{33}$ switching times so that the low frequency parts of synthetized output voltages $Vo_1, Vo_2, Vo_3$ and input currents $Ii_1, Ii_2, Ii_3$ are sinusoidal with the prescribed output frequency, input frequency and amplitude respectively.

For the sake of simplicity, let us first consider the synthesis of one output line only (FIG. 1a). The output line is connected to the three inputs by means of the three switches $S_1, S_2, S_3$. The switches are closed sequentially, and cyclically. During the $K^{th}$ switching sequence, let the times for which the switches $S_1, S_2, S_3$ are closed be $t_1^k, t_2^k, t_3^k$ where $t_1^k + t_2^k + t_3^k = Tseq = (1/fseq)$ and where $Tseq$ is a constant.

The times, $t_1^k, t_2^k, t_3^k$ determine the converter operation.

The output voltage waveform $V_0$ is a discontinuous function, which consists of parts of the three input voltages, assembled sequentially. In general, the output voltage Fourier Spectrum depends on input voltage, frequency, and on the converter switching law. However, the low frequency part of the output Fourier spectrum depends mainly on the average output value in each sequence, as long as $\omega_o << 2\pi fseq$. In other words, if $fseq \to \infty$, all functions having the same average value during the time intervals $Tseq$ have the same spectrum, no matter how they are synthesized. If a sinusoidal waveform is to be synthesized, the switching law must be chosen so that the sequence average output value varies sinusoidally.

In this case, assume $$\omega_i, \omega_o << 2\pi f_{seq}$$

In the above discussion only the sequence average values are considered. During the $K^{th}$ sequence, the average output voltage can be approximated by $$Vo_{av}{}^k = (V_1 t_1{}^k + V_2 t_2{}^k + V_3 t_3{}^k)/Tseq \tag{3}$$

where $V_1$, $V_2$, $V_3$ are the input line voltages, measured at the same time during the $k^{th}$ sequence, and considered constant for the times $t_1{}^k$, $t_2{}^k$, $t_3{}^k$ respectively.

The output sequence average $Vo_{av}{}^k$ in eq. 3 can be determined by summing three vectors, representing the input voltages, rotating at angular frequency $\omega_i$, weighted by the switching times $t_1{}^k$, $t_2{}^k$, $t_3{}^k$ (FIG. 2).

If, for all k, for example, $$t_1{}^k = t_2{}^k = t_3{}^k, \text{ then}$$

the average output voltage is zero.

If, for all k, for example, $t_1{}^k$, $t_2{}^k$, $t_3{}^k$ are constant the resulting output vector is fixed with respect to the input vectors. Therefore, the output voltage is sinusoidal, at the input frequency, and its amplitude and phase can be adjusted by varying $t_1$, $t_2$, $t_3$.

Finally, if $$t_1{}^k = \frac{Tseq}{3}[1 + 2 \cdot q \cdot \cos(K \cdot Tseq\, \omega_m)] \tag{4}$$

$$t_2{}^k = \frac{Tseq}{3}\left[1 + 2 \cdot q \cdot \cos\left(K \cdot Tseq\, \omega_m - \frac{2}{3}\pi\right)\right]$$

$$t_3{}^k = \frac{Tseq}{3}\left[1 + 2 \cdot q \cdot \cos\left(K \cdot Tseq\, \omega_m - \frac{4}{3}\pi\right)\right],$$

where q is a constant and $\omega_m$ is a constant angular modulation frequency, the resulting vector $V^k$ has constant amplitude q Vi, and as K increases rotates with respect to the input vectors, with angular frequency $\omega_m$. Therefore, the output voltage is sinusoidal, characterized by amplitude q·Vi and angular frequency $\omega_o = \omega_i + \omega_m$.

Note that $\omega_m$ in (4) need not be positive. If $\omega_m = -\omega_i$, the converter degenerates into an AC-DC converter. If $\omega_m < -\omega_i$, $\omega_o < 0$; however, no difference exists between positive and negative output frequencies. Therefore, the converter can synthesize the same output frequency in two operating modes:

Symmetric mode: $\omega_m > -\omega_i$, $\omega_o = \omega_i + \omega_m$

Antisymmetric mode: $\omega_m < -\omega_i$, $\omega_o = -(\omega_i + \omega_m)$, giving two possible values of $\omega_m$ for the same $\omega_o$.

The simplified converter of FIG. 1(a) can be easily extended to three output phases (FIG. 3). The bidirectional switches of three sets of monophase converters, operated according to equations (4), are connected to the input conductors in a cyclic permutation.

Figure 4:
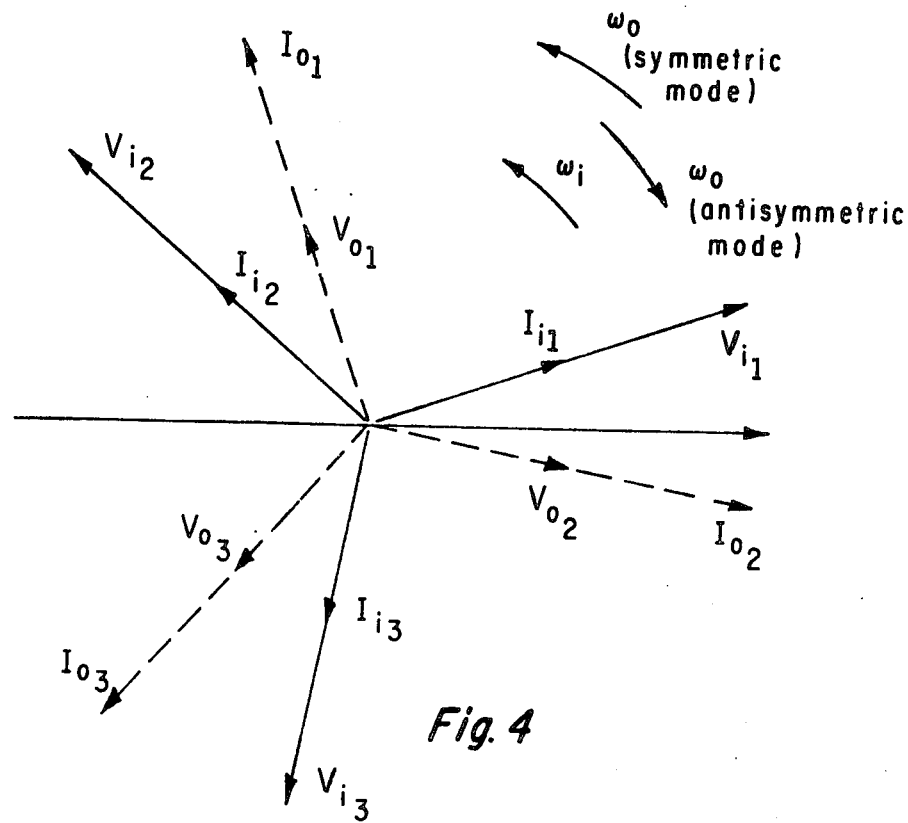
FIGS. 4 and 5 are vector diagrams to be used in explaining the operation of the converter of FIG. 3.
Figure 5:
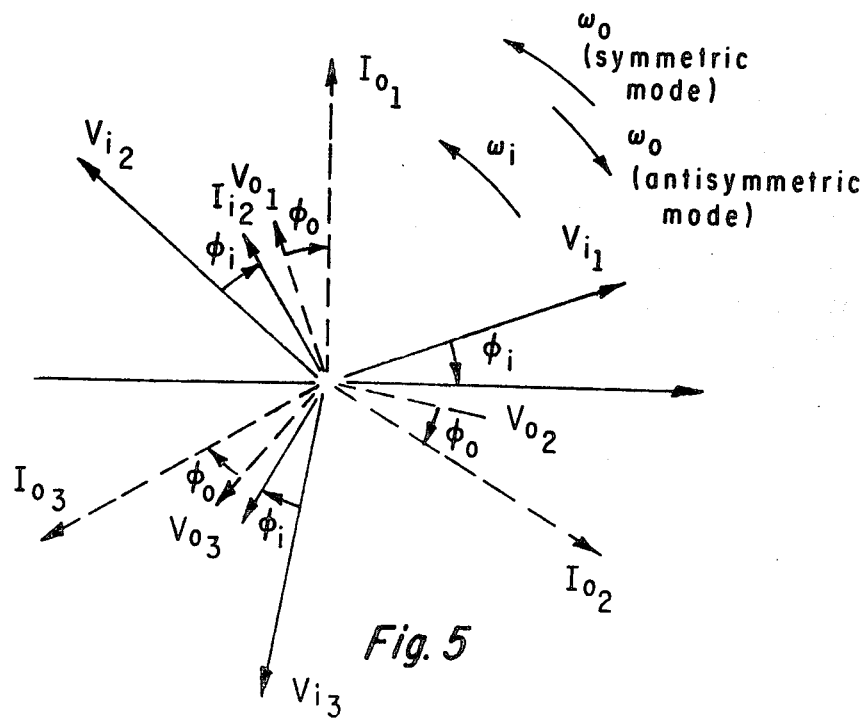

A cyclic permutation acts as a reference rotation in FIG. 4 and FIG. 5. Therefore, if the input three phase system is balanced, the three output phases are naturally equidisplaced. The block diagram of such a converter is shown in FIG. 13. The total existence or modulation matrix of the converter can be easily derived from equations (4): as follows: Let $$t_x = \left[\frac{1}{Tseq} \cdot t - int\left(\frac{1}{Tseq} \cdot t\right)\right] \cdot 3 \tag{5}$$

$$f(t) = 1 + q \cdot 2 \cdot \cos\left[\omega_m \cdot Tseq \cdot int\left(\frac{1}{Tseq} \cdot t\right)\right]$$

$$f'(t) = 1 + q \cdot 2 \cdot \cos\left[\omega_m \cdot Tseq \cdot int\left(\frac{1}{Tseq} \cdot t\right) - \frac{2\pi}{3}\right]$$

then $$E(t) \equiv \begin{pmatrix} 1(t_x) - 1(t_x - f) & 1(t_x - f) - 1(t_x - f - f') & 1(t_x - f - f') \\ 1(t_x - f) - 1(t_x - f - f') & 1(t_x - f - f') & 1(t_x) - 1(t_x - f) \\ 1(t_x - f - f') & 1(t_x) - 1(t_x - f) & 1(t_x - f) - 1(t_x - f - f') \end{pmatrix}$$

where the symbol 1(t) indicates the Dirac step function (of t) Note that $E = E^T$; i.e., the converter is completely symmetrical. No difference exists between input and output ports. Because of the converter symmetry, while the inut voltage is converted to the output frequency, the same conversion is applied to the output current. Hence, the converter operation described above is characterized by a sinusoidal input current at the input frequency, independent of the output frequency (even for D.C. output).

As previously pointed out, the converter can synthesize any output frequency in two operating modes. The difference between the two modes can be understood referring to FIGS. 4 and 5. In FIG. 4 $Vi_1$, $Vi_2$, $Vi_3$ and $Vo_1$, $Vo_2$, $Vo_3$ represent input and output voltages respectively. If the load is resistive, $Io_1$, $Io_2$, $Io_3$ and $Ii_1$, $Ii_2$, $Ii_3$ represent output and input currents. If a phase displacement between current and voltage is introduced at the output port (FIG. 5), it acts as a reference rotation in the input current synthesis. Therefore, the output phase displacement is found unchanged at the input port. However, in symmetric mode, a lagging displacement in the output is lagging in the input, while in antisymmetric mode, a lagging output displacement is leading in the input. As a consequence, inductive loads can be turned by the converter into capacitive ones. The converter is capable of reactive power generation.

In the above discussion, the new converter operation has been shown to enable all of the "ideal" requirements listed above to be approached. As a circuit element, a high switching rate converter (HSRC) can be considered a generalized AC transformer, capable of varying frequency, amplitude and phase of the electric energy flowing through it. The conversion is determined by three parameters:

S: (+1 or −1); conversion mode (symmetric or antisymmetric),
q: ($0 \leq q \leq 0.5$); output-input amplitude ratio,
$\omega_m$: ($-\infty < \omega_m < \infty$); input-output frequency shift.

When these parameters are set, the converter can be modeled as a two-port, conservative, polyphase input-polyphase output circuit element, whose constitutive relations are, for sinusoidal or DC waveforms only:

$$Vo = q \cdot Vi$$

$$Io = \frac{1}{q} \cdot Ii$$

| Symmetric mode: | Antisymmetric mode: |
|---|---|
| S = 1 | S = −1 |
| $\omega_m > -\omega_i$ | $\omega_m < -\omega_i$ |
| $\omega_o = \omega_i + \omega_m$ | $\omega_o = -(\omega_i + \omega_m)$ |
| $\phi_o = \phi_i$ | $\phi_o = -\phi_i$ |

In the above discussion, the converter operation has been described within the approximation $\omega_i, \omega_o < < 2\pi \cdot$ fseq. In practice, the converter switching rate fseq is limited by device switching efficiency considerations. Therefore, since fseq is a finite number, a certain amount of unwanted harmonics, neglected so far, is present in the converter waveforms. In fact, the Fourier spectrum of the actual converter waveforms consists of the wanted component, at low frequency, and of an unwanted component spectrum, which is due to the discontinuity of the synthesized waveforms, and to the approximations introduced in deriving the converter existence matrix. However, as long as $$fseq \geq \frac{\max(\omega_i, \omega_o)}{2\pi} \cdot 8,$$

the unwanted components have been found to be significant only at frequencies $f > \frac{1}{2}$fseq, being less than 1% of the wanted component at frequencies comparable or lower than the input and output frequencies. The unwanted frequency components of the output waveforms can be removed by filtering.

It has been explained that phase displacements in opposite senses can be introduced in the input supply by the use of the symmetric and antisymmetric modes. If both of these modes are used at the same time the effect on the input supply of a phase displacement in the output supply can be made self cancelling. Thus the output supply can be connected to a reactive load and the current and voltage waveforms of the input supply can be kept in phase, the converter and load together appearing as a resistance. Other power factor adjustments can also be effected by the converter. If the output frequency is equal to the input frequency a single converter could be used as described above to give phase displacement cancellation.

Although the theory has been given for the most common cases of a 3-phase input supply and a single or 3-phase output supply, it will readily be appreciated that the invention can equally well be applied to the conversion of an n-phase input supply ($N \geq 3$) to a p-phase output supply ($P \geq 1$).

For a 3-phase input supply, it will be apparent that $Vo \leq (Vi/2)$ and therefore $Ci \leq (Co/2)$, if all possible phase relationships between Vo and Vi are required, for example if the output frequency is different from the input frequency. Moreover, the input power is equal to the output power, that is: $Vo.Co \cos \phi_o = Vi.Ci \cos \phi_i$, where $\phi_o, \phi_i$ are the output and input phase displacements.

A practical embodiment of the invention will now be described with reference to FIGS. 6 to 12, FIG. 6 being a block diagram of one example of a three-phase converter according to the invention. The converter includes a three-phase voltage controlled oscillator 100 having three outputs which are applied to an amplitude to pulse duration converter 101 from which separate outputs are applied to three dwell time and drive circuits 102, 103 and 104. The output of the circuit 102 is applied to the primary winding of a drive transformer 105 of which the three secondary windings are connected to respective switch modules 106, 107 and 108. Similarly the circuit 103 drives three switch modules 110, 111 and 112 through a drive transformer 109, and the circuit 104 drives switch modules 114, 115 and 116 through a drive transformer 113. The switch modules from a three by three matrix interconnecting three three-phase power supply conductors 117, 118 and 119 with three three-phase output conductors 120, 121 and 122. Since the switch modules are bidirectional, the supply and output conductors can be interchanged.

The circuit of FIG. 6 is as can be seen symmetrical for the three phases of the supply and the outputs of the amplitude to pulse duration converter 101 take the form of signals which are rapidly switched from one output conductor to another to produce voltages of the required magnitude, phase and frequency on the basis of the principles described earlier. It follows therefore that at any one time the switch modules of one group of three are conducting and the switch modules of the other two groups are non-conducting.

The voltage controlled oscillator will now be described with reference to FIGS. 7, 8a, 8b and 9 which together consitute the circuit diagram of this oscillator.

Figure 7:
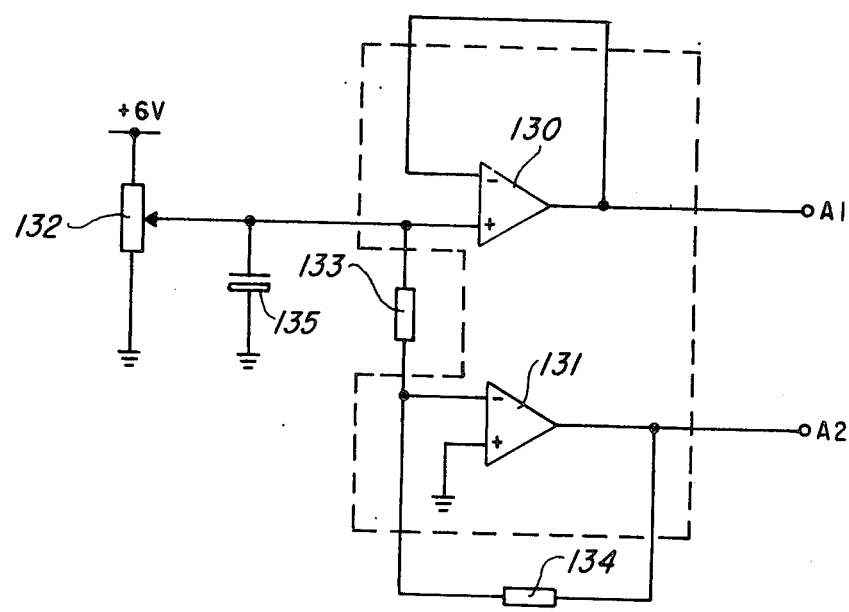

The circuit of FIG. 7 produces two output voltages equal in magnitude but opposite in sign at terminals A1 and A2 respectively. These terminals are connected to the outputs of two operational amplifiers 130 and 131 respectively. An adjustable voltage is derived from the wiper of a potentiometer 132 and applied to the non-inverting input of the amplifier 130 and via a resistor 133 to the inverting input of the amplifier 131. The amplifier 130 has a direct feedback connection from its output to its inverting input so that its output voltage is equal to its input voltage. The amplifier 131 has a resistive negative feedback connection through a resistor 134 of the same resistance as the resistor 133 so that its output voltage is the inverse of the voltage at the wiper of the potentiometer 132. A capacitor 135 is provided connecting the wiper of the potentiometer to earth to absorb noise and spurious voltage changes from the wiper.

Figure 8A:
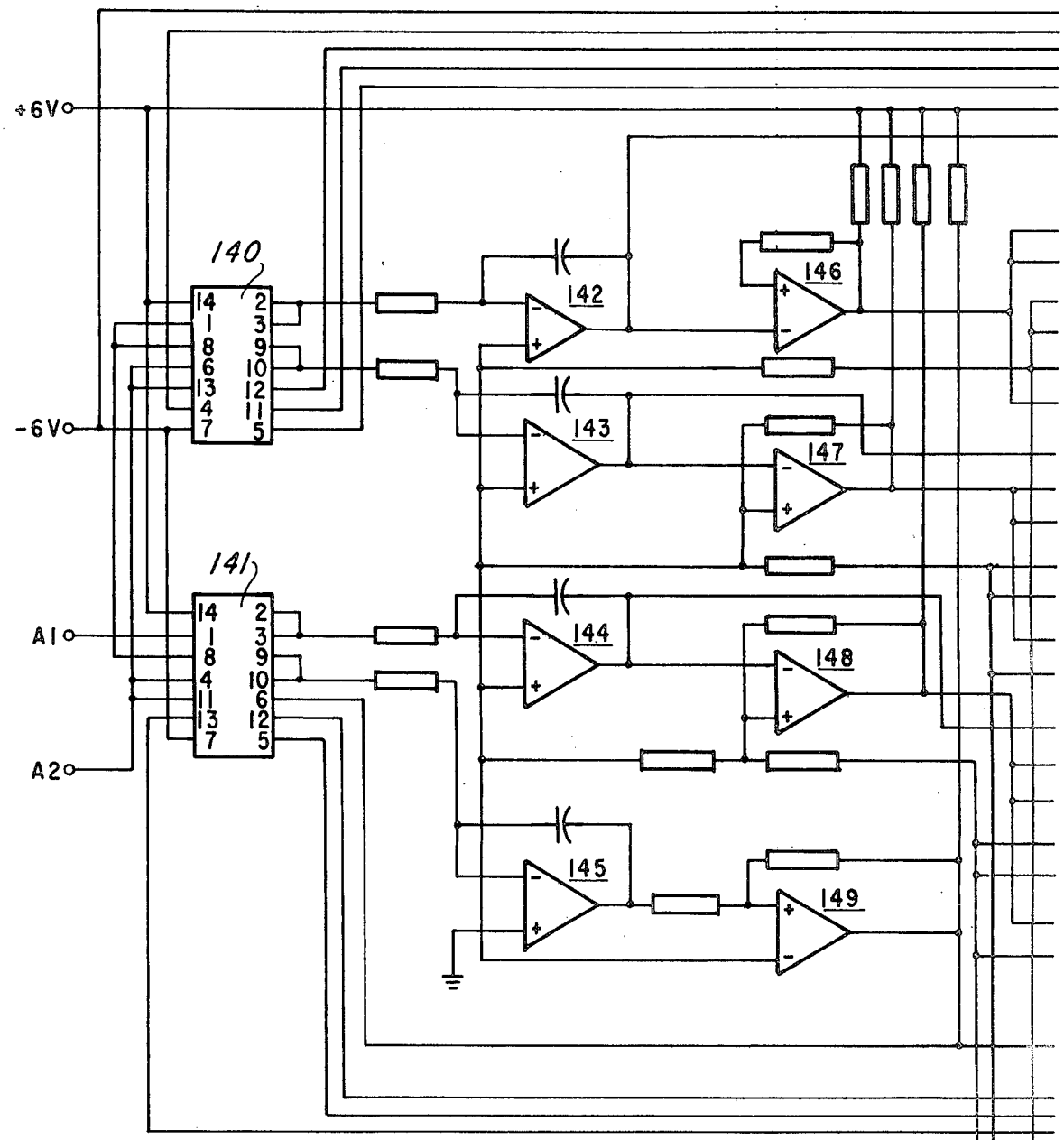
Figure 8B:
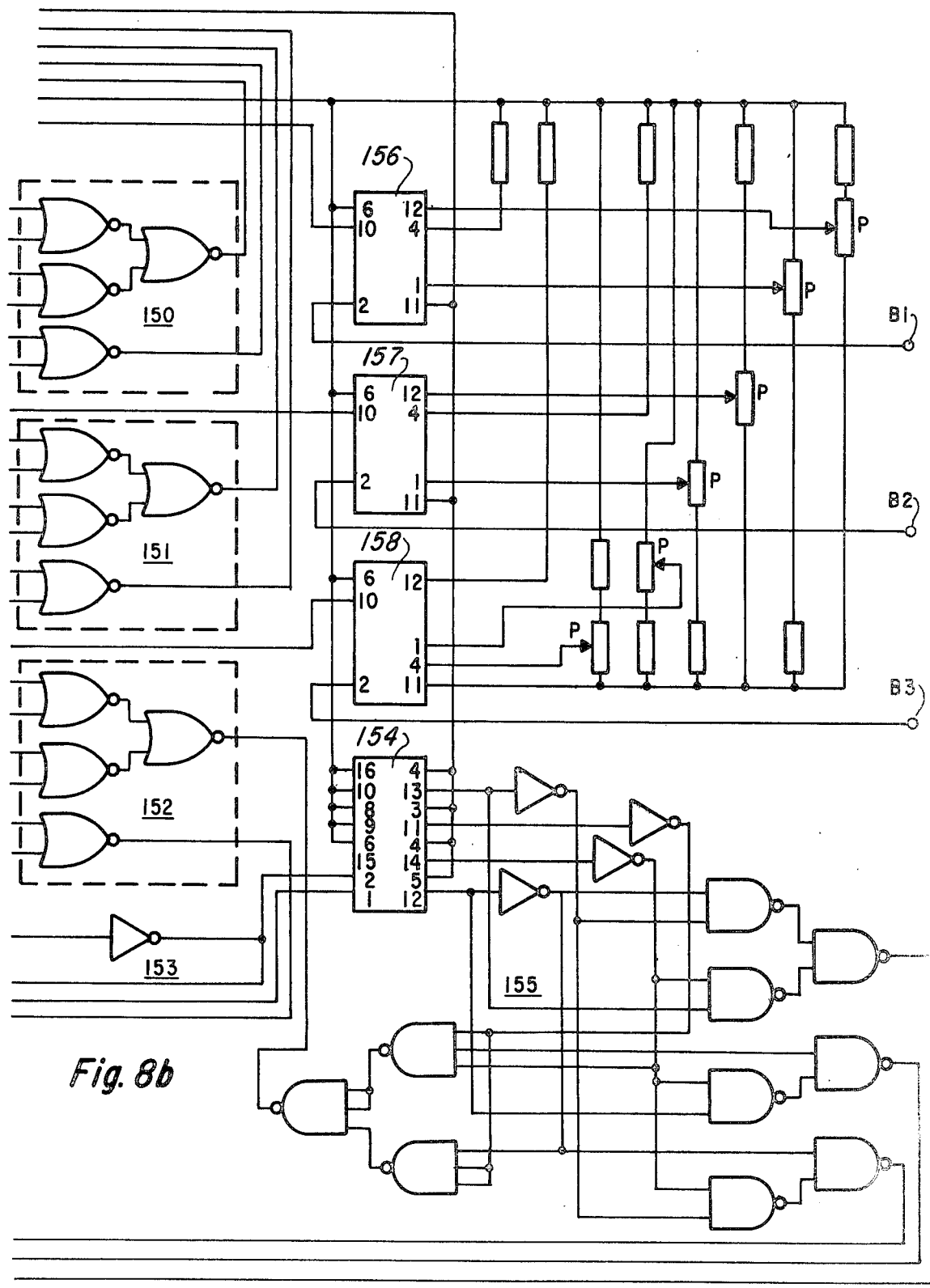

The terminals A1 and A2 of FIG. 7 are connected to terminals A1 and A2 of FIGS. 8a and 8b which in turn are connected to pairs of inputs of two analogue switches 140 and 141 which may be, for example, of type MC 14066. These switches which are quad devices, have their output connections joined in pairs and each pair of outputs is connected to a respective one of the integrators 142 to 145. The output voltages of the integrators are applied to inputs of respective ones of the Schmitt trigger circuits 146 to 149. The outputs of the trigger circuits 146, 147 and 148 are applied to inputs of logic circuits 150, 151 and 152, each of which produces two output signals which are connected to inputs of the switches 140 and 141 to control the routing of the signals applied to the terminals A1 and A2 to the integrators 142 to 145.

The output of the fourth trigger circuit 149 is applied through an inverter 153 to the input of a counter 154 which may, for example, be a 74C 163. The counter 154 is a four-bit counter and has four output connections which are applied to a logic circuit 155, the outputs of which are applied to inputs of the logic circuits 150 to 152 to control them. The output waveforms of the integrators 142, 143 and 144 are also applied to respective waveform generators 156, 157 and 158, typically of type ICL 8038, the function of which is to convert a triangular waveform received from the integrators 142, 143 and 144 into sinusoidal output waveforms which are fed to terminals B1, B2 and B3 respectively. Potentiometers P are provided for applying particular voltage levels to the generators 156 to 158 so as to optimise the sinusoidal shaping of the output waveforms.

The operation of the circuit of FIGS. 8a and 8b is as follows. The voltages at the terminals A1 and A2 as set by the adjustment of the potentiometer 132 of FIG. 7 are directed by the switches 140 and 141 to the integrators 142 to 145. The integrator 145 has a time constant which is 1/6th of that of the integrators 142, 143 and 144 so that it executes six cycles of a triangular waveform within the period of one cycle of the triangular waveforms produced at the outputs of the integrators 142, 143 and 144. The trigger circuit 149 produces a succession of output pulses which are counted by the counter 154. As the total in the counter 154 increases, the logic circuit 155 applies control signals to the logic circuits 150, 151 and 152 to adjust the routing of the voltages at the temminals A1 and A2 to the integrators 142, 143 and 144 so that these three integrators produce triangular output waveforms of the same frequency but equidistant in phase from one another; the function of the logic circuits 150, 151, 152 and 155 being such as to ensure that the different ramps of the triangular waveforms start at the correct times so that frequency differences arising from the slight variations in component values in the integrators 142 to 144 and the triggers 146 to 148 cannot cause an accumulated phase or frequency error between the three triangular waveforms. As mentioned above, the waveform generators 156 to 158 convert the triangular waveforms from the integrators 142 to 144 into corresponding sinusoidal waveforms which are again equidistant in phase from each other, being $2\pi/3$ radians apart, at the terminals B1, B2 and B3. It will be apparent that adjustment of the potentiometer 132 (FIG. 7) will change the magnitude of the voltages applied to the terminals A1 and A2 and consequently modify the frequencies of both the triangular and sinusoidal waveforms produced in the circuit of FIGS. 8a and 8b, increase in voltage resulting in an increase in frequency with a substantially linear relationship between them.

Figure 9:
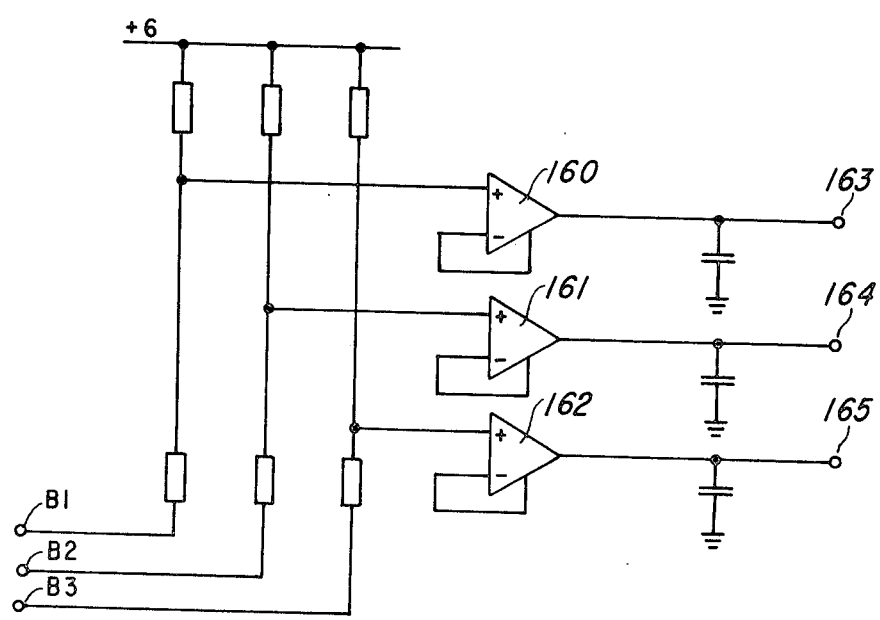

FIG. 9 shows the third part of the voltage controlled oscillator and has input terminals B1, B2 and B3 to which the terminals B1, B2 and B3 of FIGS. 8a and 8b are connected. In FIG. 9 the terminals B1 to B3 are connected respectively to the non-inverting inputs of operational amplifiers 160, 161 and 162. These amplifiers have direct negative feedback from their outputs to their inverting inputs so that the output voltage produced by them are equal to the voltages applied to their non-inverting inputs. The outputs of the amplifiers 160, 161 and 162 appear at terminals 163, 164 and 165 respectively.

As is apparent from FIG. 6, the three outputs of the voltage controlled oscillator are applied to an amplitude to pulse duration converter. The circuit of this converter is shown in FIG. 10 and the three outputs from the voltage controlled oscillator are applied respectively to terminals 200, 201 and 202. The converter contains three counter timer circuits, typically of type 555, numbered 203, 204 and 205. The terminals 200, 201 and 202 are applied to the terminals 5 of the counter timers, which are connected to respective resistors 206 to 208 and capacitors 209 to 211 to form monostable circuits. The monostable circuits are interconnected by capacitors 212, 213 and 214 to form a three stage ring so that as each timer is reset the next timer is set, the time constants being chosen so that the "set" state cycles round the ring between 5,000 and 25,000 times per second. Linked constant current sources including transistors 215, 216 and 217 are provided to ensure that the time constants of the monostable circuits are substantially identical. A common amplitude control is provided by a potentiometer 218 which by means of an emitter-follower connected transistor 219 establishes a voltage on a conductor 220 which is connected through diodes to the time constant capacitors 209 to 211.

The function of the converter of FIG. 10 is to respond to differences in amplitude of the relatively slowly cycling sinusoidal signals (e.g. 50–200 Hz) applied to the terminals 200, 201 and 202 to vary relatively to one another the durations for which the monostables are set and therefore the lengths of the pulses appearing at output terminals 221, 222 and 223. The amount of the variation of the pulse durations can be adjusted by the amplitude control potentiometer 218, and from the theory set out above it can be seen that this adjustment adjusts the amplitude of the AC output voltages.

FIG. 11 shows the circuit of a dwell time and drive circuit, to three of which circuits the three outputs of the converter 101 of FIG. 10 are applied. The output signal from the converter is applied to terminal 250 in FIG. 11 which is connected through a resistor 251 and a diode 252 connected in parallel to the base of a transistor 253. A capacitor 254 is connected between the base of the transistor 253 and earth. The emitter of the transistor 253 is also earthed and its collector is connected through the base of a transistor 258 which has its emitter electrode connected to the conductor 257. The collector of the transistor 258 is connected through a transformer primary winding 259 to a second supply conductor 260, a zener diode 261 and another diode 262 being connected in series across the winding 259.

The chief function of the circuit of FIG. 11 is to provide adequate drive to operate the three switches to which the secondaries of the transformer are connected. It also serves to delay slightly the build-up of current through the primary winding 259 in response to a positive-going pulse applied to the terminal 250 by the effect of the time constant provided by the resistor 251 and the capacitor 254. Typically the resistor 251 is of 1kΩ resistance and the capacitor of 0.001 μF. When the positive-going pulse at the terminal 250 terminates the capacitor 254 is discharged rapidly through the diode 252. The effect of this part of the circuit is to ensure that time is allowed for the dwell time of the switches SM needed for them to become open circuit to ensure that at no time are two input conductors connected through conducting switches to the same output conductor which, if it occurred, would result in large and damaging currents flowing. The zener diode 261 and the diode 262 are provided to pass current when the transistor 258 becomes non-conducting thereby preventing a relatively high voltage appearing at the collector of the transistor 258 which might damage that transistor. The primary winding driven by the dwell time and drive circuit shown in FIG. 11 is part of one of the drive transformers 105, 109 and 113 shown in FIG. 6. The primary winding in one example consisted of 45 turns and each of the three secondary windings consisted of 10 turns on a pot core the core was provided with an air gap of 0.51 mm.

Each of the three secondary windings on each of the drive transformers is connected to drive a switch module and a typical switch module is shown in FIG. 12. The secondary winding is shown in FIG. 12 and has the reference 300 and is connected to apply a drive signal across the base emitter diode of a transistor 301. A current limiting resistor 302 is provided in the connection to the base electrode and diodes 303, 304 and 305 together with zener diode 306 are provided to protect the transistor against undesirable overloads and to limit its hole storage time. The switch itself is formed of a diode bridge including diodes 307, 308, 309 and 310, the switch having terminals 311 and 312. The operation of the switch module is conventional in that when the transistor 301 is non-conducting there can be no current passed from the terminal 311 to the terminal 312 or in the opposite direction, because the diodes 307 to 310 are connected as back-to-back pairs. When the transistor 301 is conducting, however, current can flow from the terminal 311 to the terminal 312 through the diode 307, the transistor 301 and the diode 310. Current can flow in the reverse direction via diode 308, transistor 301 and diode 309.

The circuit arrangement just described with reference to FIGS. 6 to 12 is capable of providing adjustments in amplitude, frequency and phase of the output voltage relative to the input voltages. However, as has been described above with reference to FIG. 5, it is possible to produce the same output frequency $\omega_o$ in two different ways either by using a modulation frequency $\omega_m = \omega_o - \omega_i$, where $\omega_i$ is the input frequency and forming the modulation is such a way that $\omega_o = \omega_m + \omega_i$; or alternatively $\omega_m$ can be chosen equal to $\omega_o + \omega_i$ and the sense of the modulation arranged so that $\omega_o = -\omega_i - \omega_m$. In the first alternative the modulation frequency is in the same sense as the input frequency ans is therefore added to it, and in the second the modulation frequency is in the opposite sense to the input frequency and therefore has the input frequency subtracted from it. It was further explained with reference to FIG. 5 that because of the opposite senses of the modulation the phase angle differences between current and voltage occur in opposite directions for output voltages produced using the two different methods just described, so that it is possible by combining both voltages to eliminate completely the phase angle difference between current and voltage as it appears to the supply applied to the input conductors. In order to produce a converter using this principle it is necessary to provide two voltage controlled oscillators, one running at a modulation frequency $\omega_m = -(\omega_o + \omega_i)$ and the other $\omega_m = \omega_o - \omega_i$. FIGS. 13a and 13b is a diagram of one example of such a converter. The two voltage controlled oscillators are 400 and 401. The oscillator 400 receives a voltage representing a modulation frequency $\omega_m = \omega_o - \omega_i$ from an analogue adder 402 to which an input representing $\omega_o$ is obtained from a potentiometer 403 and a second input representing $\omega_i$ is obtained from a frequency to voltage converter 404 to which the supply input is connected. The output $\omega_i$ of the converter 404 is also multiplied by 2 and applied to an analogue adder 405 and inverted in an inverter 406 so that the voltage representing $\omega_m$ for the oscillator 401 is equal to $-(\omega_o + \omega_i)$, the negative sign indicating that the output phase differences of the oscillator 401 are reversed. The amplitudes of the outputs of the oscillators 400 and 401 are set to a controllable value q by means of analogue multipliers 407 to 412. The value q is set up on a potentiometer 413 and is multiplied by 2 in an amplifier 414.

For full phase control it is necessary to multiply the outputs of the oscillators 400 and 401 differentially and this is achieved by setting up a value representing $\alpha1$ on a potentiometer 415 which is multiplied by $\frac{1}{3}$ in an amplifier 416 and applied to analogue multipliers 417, 418 and 419 to which the outputs of the oscillator 400 are applied. The value $\alpha1$ is also inverted in an inverter 420 and added to 1 volt in an analogue adder 421 to produce a signal equal to $1 - \alpha1$, which is then multiplied by a third in amplifier 422 to produce a signal representing $\frac{1}{3}(1 - \alpha1)$ which applied to analogue multipliers 423, 424 and 425 to which the outputs of the oscillator 401 are applied. Nine analogue adders 426 to 434 are provided to which the outputs from each of the three multipliers 417, 418 and 419 are combined with the outputs of the multipliers 423, 424 and 425 in the nine different combinations which arise from taking one output from each set of the three multipliers. In addition a constant input equal to $\frac{1}{3}$ of a volt is applied to all of the adders 426 to 434 and the outputs are applied respectively to switches S1 to S9 which interconnect three input conductors 435, 436 and 437 with three output conductors 438, 439 and 440. The switches S1 to S9 embody the amplitude to pulse duration converter 101, the dwell time and drive circuits 102 to 104, the drive transformers 105, 109 and 113 and the switch modules 106 to 108, 110, 112 and 114 to 116 of FIG. 6 as described above with reference to FIGS. 10 to 12. The monostable circuits in the switches S1 to S9 are connected to form three separate rings of three which operate as described above with reference to FIG. 10. As each ring is connected to a different output conductor they can step independently without risk of short-circuiting the supply.

Suitable circuits for the inverters, analogue adders and analogue multipliers are described, for example, in Electronic Computer Technology by N. R. Scott published by the McGraw Hill in 1970.

FIG. 14 shows the application of a high switching rate converter 500 to the control of the speed of an induction motor 501 by varying the frequency of the power supply fed to it over conductor 502. A tacho generator 503 is coupled to the output shaft 504 of the motor and produces voltage on a conductor 505 which is applied to a processing circuit 506 producing a polyphase sinusoidal output of angular frequency $\omega_m$ and an amplitude control signal q. These signals are used as described above to control the switches in the converter 500 to regulate the frequency of the supply fed to the motor 501. The arrangement can be operated in two modes. In the first mode the motor speed is kept constant regardless of the load applied to it and in this case the voltage set up on the conductor 505 is compared with a reference and is used to increase the frequency of the supply fed to the motor 501 and also its amplitude which is dependent on q. Thus as the slip between the supply frequency and the motor speed increases with load, the supply frequency is increased to keep the motor speed more constant. In the second mode, which is the constant torque mode, the slip between the motor speed and the supply frequency is measured and is kept at constant value so as to ensure that the torque supplied by the motor is constant.

The circuit arrangement of FIG. 14 could also be used to regulate the frequency of a voltage supply generated by a generator operated at variable sped by adjusting the angular frequency $\omega_m$ of the modulation signal to compensate for variations in the output frequency of generator due to variation in its shaft speed. The arrangement could also be used to synchronise the generated supply with an existing supply so that is could be added to the existing supply. The generator could alternatively be controlled to provide a constant current.

FIG. 15 shows the use of a microprocessor 520 to generate the wdith modulated pulses required to operate the switches S1 to S9. The microprocessor is driven by a clock 521 and has address output lines 522, data input/output lines 523, scanning output lines 524 and data output lines 525. A keyboard 526 receives the scanning pulses from the lines 524 and produces the corresponding input pulses on the conductors 523. A read-only memory 527 stores the program for the microprocessor 520, and a random access memory 528 stores the data fed into it from the keyboard 526 and produced during calculation. A four-digit seven-segment display 529 is provided driven by the scanning pulses on the lines 524 and from the address bus to provide an indication of data entered by the keyboard 526 or other information which may be required by an operator. The address bus 522 is also connected to operate a selector 530 which directs the data received over the lines 525 to nine latches 531 respectively storing the conductive state required of the switches S1 to S9. In operation the microprocessor 520 performs the calculations necessary to determine which of the latches 531 should be in the 1 state indicating that the corresponding switch is conductive, and which in the 0 state indicating that the corresponding switch is non-conducting. These calculations are based on the theory described earlier.

Figure 16:
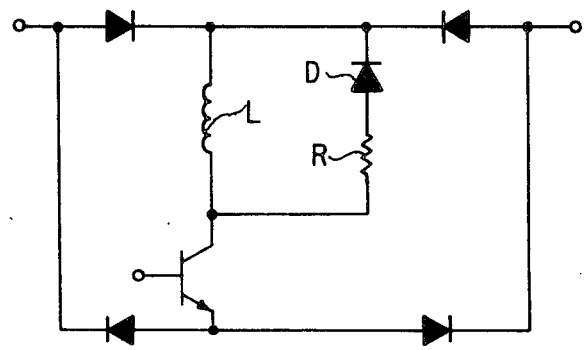

FIG. 16 shows a modification of the switch module shown in FIG. 12 in which an inductor L is provided in the collector lead of the transistor, the inductor being shunted by a diode D and a resistor R in series. These components act as voltage snubbers to limit the switch current rate of rise to a safe value during transience.

Figure 17:
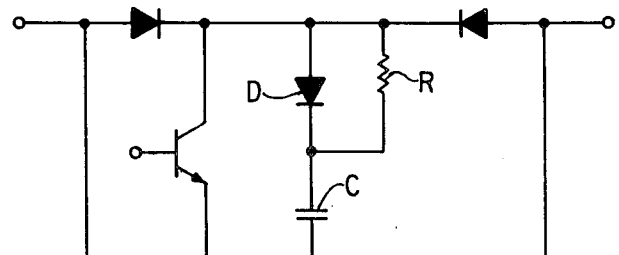

FIG. 17 shows the use of a current type snubber consisting of a current path defined by a diode D, in series with a capacitor C connected in parallel with the emitter-collector path of the transistor. A resistor R is connected in parallel with the diode D.

Figure 18:
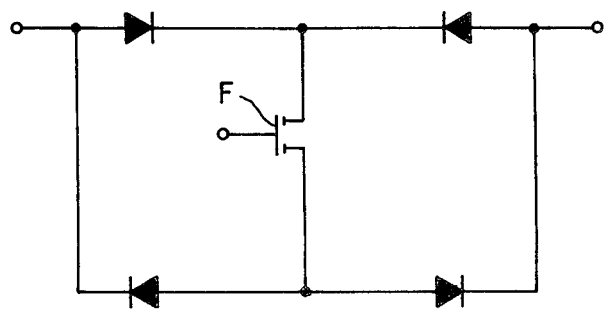

FIG. 18 shows the use of a power FET F in a diode bridge of the same type as is used in FIGS. 12, 16 and 17. Such transistors provide a very high switching frequency and can reduce the need for input and output filters. Although at present power FETs are limited in their ratings to a few kilowatts, it is expected that devices capable of handling greater powers will become available in the near future.

A further form of switch module would use thyristors connected in anti-parallel with a forced commutation drive circuit to ensure their turn-off at the end of each switching period.

Such an arrangement is illustrated by FIG. 20 which comprises three switch groups SG1, SG2 and SG3. Switch group SG1 includes three pairs of anti-parallel connected thyristors TH1, TH2 and TH3 connected individually to conductors A, B and C of a three 3-phase supply, and in common to one phase conductor D of three 3-phase output conductors D, E, and F. The thyristor pairs TH1, TH2 and TH3 are also connected at their input-phase sides to a commutation circuit COM. The individual thyristor pairs TH1, TH2 and TH3 are operated by width modulated pulses to achieve a required switching sequence in accordance with the principles previously described. The switch groups SG2 and SG3 are constructed identically to switch group SG1, the thyristor pairs of switch groups SG2 being connected in common to output phase conductor E while the thyristor pairs of switch group SG3 are connected in common to output phase conductor F. Further details of this type of switching arrangement are provided in Static Power Frequency Changers, L. Gyugi and B. R. Pelly, published by John Wiley and Sons, 1976, in particular Chapter 8 which includes description of a circuit such as the switch group and its commutation circuit (pages 346, 347) and the reset circuit (pages 360, 361) thereof shown in FIG. 20.

Since in embodiments the present invention all of the switches can be operated at the same time if no input phase control is required, a single forced commutation circuit could be used for all of the power devices using transformer coupling.

Figure 19:
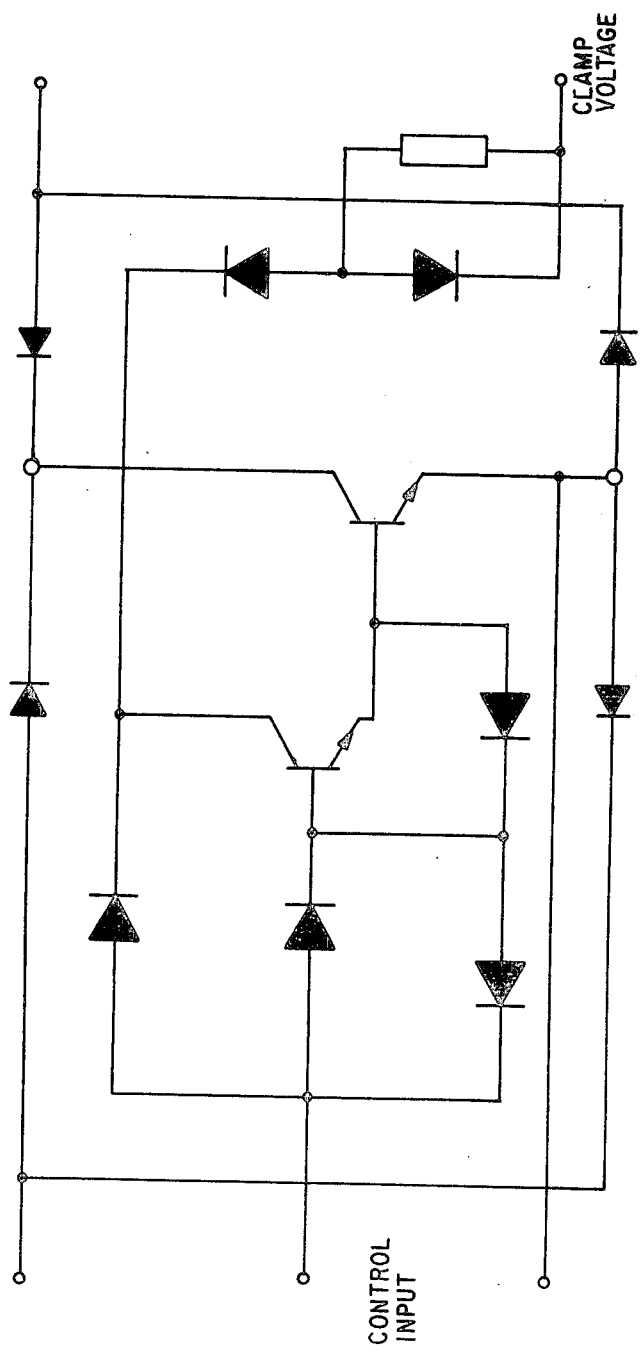

Yet another form of switch module is shown in FIG. 19 employing an advanced fast switching darlington circuit using diodes to limit and discharge the stored charges in the bases of the transistors and with a current type snubber.

The switch frequency of the switches employed in the converter is much higher, for example lying between 1,000 and 100,000 Hz, than the supply frequencies and the output frequencies of the converter. Inevitably the switching results in some undesired harmonics appearing in the input and output waveforms and these fall into two categroies. Firstly, harmonic stemming from the discontinuity of the switched wave which are comparable to those generated in pulse width modulation inverter and are grouped around frequencies which are multiples of the switching frequency. Being of much higher frequency than the supply they do not constitute a big disadvantage for inductive loads and can in any case be filtered from the supply using, for example series inductors and shunt capacitors in the conventional way. The second category of harmonics arise due to the inaccuracy of the assumption that the switching frequency is so high that neither the input nor the output waveforms will have changed within a cycle of the switching frequency. The harmonics have frequencies equal to the sum and difference of the input and output frequencies taken with the switching frequency and therefore are also sufficiently high not to interfere with the operation of loads supplied through the converter. There are no significant sub-harmonics either in the input or output of the converter.

The polyphase input required by an inverter embodying the invention could be derived from a single phase A.C. supply, for example by suing suitable reactive elements.

It will be appreciated that a converter embodying the invention is capable of reversible operation in that the input and output conductors are interchangeable; except where a reference frequency is derived from the input supply and then a changeover switch could be provided to derive the frequency from the output conductors. This means that the input supply could be obtained from the output supply despite the fact that a voltage step up is required; inductors connected in the output conductors for the purpose of smoothing the output waveforms would provide the voltage step-up as a result of the current interruption by the switches. Clearly such inductors could also be provided in the input conductors to overcome the limitation on the maximum output voltage to one half of the input voltage.

If a converter of the type shown in FIGS. 13a and 13b is arranged to produce an output of the same freqency and having the same number of phases as the input, the input and output conductors can be connected together via a transformer so that the converter becomes a reactive power generator. It may be desirable to connect inductors in series with the switches S1 to S9 to limit the currents through them.

Although the invention has been described with reference to certain specific examples, in particular those having three-phase inputs and three-phase outputs, it will be understood that the invention is equally applcable to any polyphase supply and the modifications required to the described arrangements will be apparent to those skilled in the art.

I claim:

1. A direct AC converter including input phase conductors for a balanced polyphase AC input voltage system; a plurality of output phase conductors for a polyphase AC output voltage system having at least one characteristic such as frequency, amplitude, phase angle or phase displacement which is different from that of the input voltage system; a plurality of bidirectional switch means for individually connecting each input conductor to each output phase conductor; means for producing a repeated sequence of mutually abutting width-modulated drive pulses; and means for utilizing said drive pulses to operate said bidirectional switch means at a frequency substantially higher than the frequencies of both the input and output voltage system, to connect, in respect to each output phase conductor, only one input phase conductor at a time to that output conductor and for connecting all of said input phase conductors to said at least one output phase conductor a plurality of times during any cycle of said input system or of said output system.

2. A converter according to claim 1, in which the means for utilizing said drive pulses includes data processing means having a stored program for controlling the said operation of the bidirectional switch means.

3. A converter according to claim 2, including data storage means operatively interconnected with said data processing means for controlling operation of said bidirectional switches, and means for entering input data into said data storage means for adjusting operation of said bidirectional switches under control of said stored program.

4. A converter according to claim 2 or 3, including a plurality of output latches each operatively coupled between said data processing means and an individual one of said switch means, said stored program controlling setting and resetting of the latches of the time required for the corresponding switch means to be closed and opened.

5. A converter according to claim 1 or 2 or 3, wherein said means for producing drive pulses comprises means for producing sinusoidally-width-modulated pulses.

6. A direct AC converter including input phase conductors for a balanced polyphse AC input voltage system; a plurality of output phase conductors for an AC input voltage system having at least one characteristic such as frequency, amplitude, phase angle or phase displacement which is different from that of the input voltage system; a plurality of bidirectional switch means for individually connecting each input phase conductor to each output phase conductor; control means comprising oscillator means for generating equiphase displaced sinusoidal outputs equal in number at least to the number of input phase conductors and for maintaining said equiphase displacement between said sinusoidal outputs, and timing means for receiving said equiphase displaced sinusoidal outputs and producing a repeating sequence of mutually abutting sinusoidally-width-modulated drive pulses; and means for utilizing said drive pulses to operate said bidirectional switch means at a frequency substantially higher than the frequencies of both the input and output systems, to connect, in respect of each said output phase conductor, only one input phase conductor at a given time to that output phase conductor and for connecting all of said input phase conductors to each output phase conductor a plurality of times during any cycle of said input system or of said output system.

7. A converter according to claim 6 wherein for each output phase conductor the drive pulses of the sequence are applied respectively to the switch means which are connected to that output phase conductor, the correspondence between the pulses of the sequence and the input phase conductors being shifted cyclically for the different output phase conductors.

8. A converter according to claim 4 wherein the timing means includes a ring of monostable circuits connected so that the resetting of one monostable circuit sets the next monostable circuit in the ring, each monostable circuit having an input for a width modulating signal which determines the set time for that circuit, and means for deriving said sequence of width-modulated pulses from the monostable circuits.

9. A converter according to claim 8 including means for applying a variable voltage to the monostable circuits thereby to adjust the response of the circuits to the width modulating signals.

10. A converter according to claim 6, including a polyphase sinusoidal waveform generator means for producing the same number of equally phase displaced since waves as there are phases in the input voltage system, and means for applying each sine wave to a modulator means for modulating in width a respective pulse of the sequence.

11. A converter according to claim 10 including means for adjusting the amplitude of the sine waves produced by the generator.

12. A converter according to claim 6, wherein the control means comprises digital differential analyser means for generating the repeating sequence of width modulated pulses.

13. A direct AC converter including input phase conductors for a balanced N-phase AC input voltage system; output phase conductors for a balanced polyphase AC output voltage system having at least one characteristic such as frequency, amplitude, phase angle or phase displacement which is different from that of the input voltage system; a plurality of bidirectional electronic switch means for individually connecting each input phase conductor to each output phase conductor; control means which includes two groups of N frequency controllable sinusoidal oscillator means, each group of N oscillator means for producing N equally phase-displaced sinusoidal outputs, the frequencies of said two groups of oscillator means being, respectively, (i) the desired frequency of said output system less the frequency of said input system with said phase displaced outputs arranged in one sense, and (ii) the sum of the frequencies of said input and output systems but with the phase displaced outputs arranged in a sense opposite from said one sense; means for controlling the amplitudes of the outputs of said groups of oscillator means in response to a common control signal; means for controlling the amplitude of the outputs of one of said groups of oscillator means differentially with respect to the outputs of the other said group of oscillator means; summing means for summing the outputs of the oscillator means of one said group of oscillator means individually with the outputs of the oscillator means of the other said group of oscillator means to produce $N_2$ summed outputs; means for converting said summed outputs into sequences of abutting sinusoidally-width-modulated drive pulses; and means for utilizing said drive pulses to operate said bidirectional switch means to connect, in respect of each said output phase conductor, only one input phase conductor at a given time to that output phase conductor.

14. A converter according to claim 13, wherein said means for utilizing said drive pulses is operable for connecting all of said input phase conductors to each output phase conductors a plurality of times during each cycle of said input system or of said output system.

15. A converter according to claim 6 or claim 13 or claim 14, wherein each switch means includes a four-diode bridge circuit and a controllable semiconductor element connected across a diagonal of the bridge, the other diagonal of the bridge being connected in a current path joining one of said input phase conductors to one of said output phase conductors.

16. A converter according to claim 15 wherein the controllable semiconductor element is a bipolar transistor.

17. A converter according to claim 15 wherein the controllable semiconductor element is a darlington pair of bipolar transistors.

18. A converter according to claim 16 including diode means connected to reduce the charge storage time of the transistor or transistors when switched off.

19. A converter according to claim 15 wherein the controllable semiconductor device is a power field effect transistor.

20. A converter according to claim 6 or claim 13 or claim 14, wherein each switch means comprises a pair of thyristors connected in anti-parallel.

21. A converter according to claim 15, including means for protecting the controllable semiconductor device from high voltage transients when switched.

22. A converter according to claim 6 or claim 13 or claim 14, wherein each said switch means is characterized by an opening delay, and wherein said switch operating means utilizes said drive pulses to apply closing and opening signals to said switch means; and for each said switch means, means for delaying response of that switch means to a closing signal by an amount corresponding to said open delay but not delaying response of that switch to an open signal.

23. A converter according to claim 6 or claim 14 wherein the sequence of drive pulses is repeated between 1,000 and 100,000 times per second.

24. A direct AC converter including input phase conductors for a balanced polyphase AC input voltage system; at least one output phase conductor for an AC output voltage system having at least one characteristic such as frequency, amplitude, phase angle or phase displacement which is different from that of the input voltage system; a plurality of bidirectional switch means for individually connecting each input conductor to said at least one output phase conductor; control means comprising oscillator means for generating equiphase displaced sinusoidal outputs equal in number at least to the number of input phase conductors and timing means for receiving said equiphase displaced sinusoidal outputs and producing a repeated sequence of mutually abutting sinusoidally-width-modulated drive pulses; and means for utilizing said drive pulses to operate said bidirectional switch means at a frequency substantially higher than the freequencies of both the input and output voltage systems, to connect, in respect of the said at least one output phase conductor, only one input phase conductor at a time to that output phase conductor and for connecting all of said input phase conductors to said at least one output phase conductor a plurality of times during any cycle of said input system or of said output system.

25. A converter according to claim 24 wherein the output system is a polyphase system.

26. An engine speed control system comprising:
an engine having a shaft; tachometer means coupled to the shaft for generating a signal indicative of the speed of said shaft; a direct AC converter including input phase conductors for a balanced polyphase A.C. input voltage system a plurality of output phase conductors for a balanced polyphase A.C. output voltage system having at least one characteristic such as frequency, amplitude, phase angle or phase displacement which is different from that of the input voltage system; a plurality of bidirectional switch means for individually connecting each input phase conductor to each output phase conductor; means coupling either said input phase conductors or said output phase conductors to said engine; timing means for producing a repeated sequence of mutually abutting width-modulated drive pulses; means for utilizing said drive pulses to operate said bidirectional switch means at a frequency substantially higher than the frequencies of both the input and output voltage systems, to connect, in respect of each said output phase conductors, only one input phase conductor at a time to that output phase conductor and for connecting all of said input phase conductors to each said output phase conductor a plurality of times during each cycle of said input system or of said output system; control means connected to receive an output signal indicative of shaft speed from said tachometer means and utilizing said tachometer output signal to adjust the width modulated drive pulses produced by said timing means and thereby control the engine speed.

27. A system according to claim 26, wherein said means for producing drive pulses comprises means for producing sinusoidally-width-modulated pulses.

28. A system according to claim 26, wherein the engine is a polyphase motor coupled to said output phase conductors; and wherein said tachometer output signal is utilized for adjusting the drive pulses to control the motor speed.

29. A system according to claim 28, wherein the tachometer output signal is compared with a reference speed signal and is utilized to adjust the drive pulses to maintain a substantially constant motor speed.

30. A system according to claim 28, wherein the tachometer output signal is compared with the A.C. output voltage of said converter and is utilized for adjusting the drive pulses to maintain a substantially constant motor torque.

31. A system according to claim 26, wherein the engine is a generator and said tachometer output signal is utilized for adjusting the engine speed to control the frequency of said A.C. output voltage system.

32. A system according to claim 31, wherein the tachometer output signal is utilized for adjusting the timing pulses to adjust the engine speed to cause the converter to apply to said output phase conductors a constant frequency AC signal despite variations in the generator shaft speed.

* * * * *